3,293,689
EXTRUSION DIE DECKLE

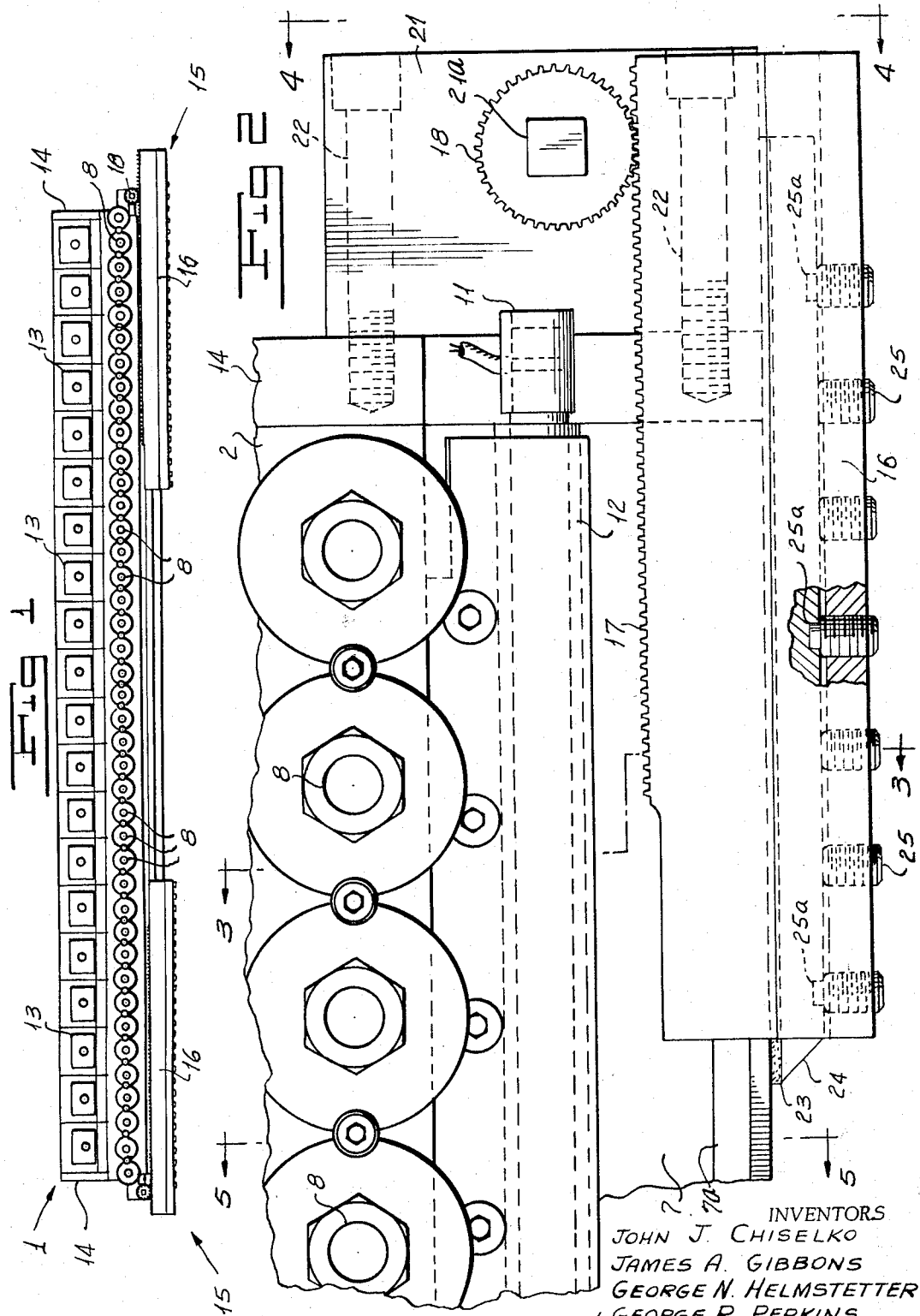

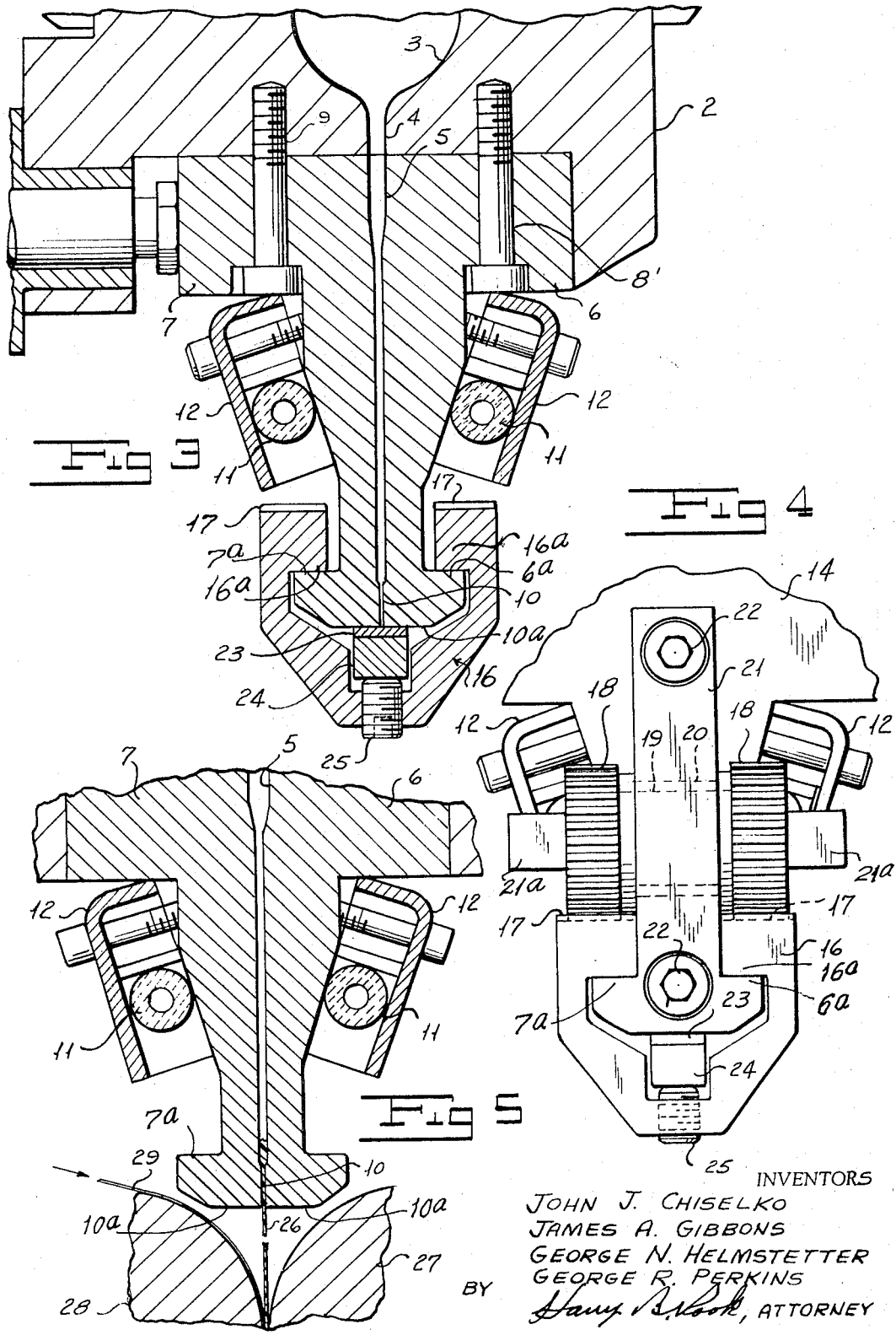

John J. Chiselko, Martinsville, James A. Gibbons, Somerville, George N. Helmstetter, Belle Mead, and George Robert Perkins, Bound Brook, N.J., assignors to Frank W. Egan & Company, Somerville, N.J., a corporation of New Jersey
Filed May 4, 1964, Ser. No. 364,368
2 Claims. (Cl. 18—12)

This invention relates to extrusion dies for plastic materials and more particularly to means for regulating the width of the plastic film or sheet extruded from dies having an orifice in the shape of a long narrow slit. More specifically the invention contemplates a die having an elongated slot for forming films or sheets of flowable plastic material and provided with bearing surfaces for a deckle bar each extending outwardly from and along one edge of said slot, with the deckle bar bridging the slot and in slidable sealing contact with said bearing surfaces, means including a track on said die at each side of the slot and parallel thereto on which is mounted a deckle bar carrier having a hanger slidable on each track and holding the deckle bar in sealing contact with said surfaces on the die, and means for driving the carrier longitudinally along said tracks.

An object of the invention is to provide in such a combination of parts, novel and improved means for driving the deckle bar carrier longitudinally along the tracks which are simple and inexpensive in construction, which can be easily removed from the die and easily reinstalled on the die, which require a minimum of maintenance and are self-contained and do not require sources of electric power, water, air, hydraulic power, etc.

Another object is to provide a combination of parts as described wherein the means for driving the deckle bar carrier comprises a simple, inexpensive and easily operable combination of at least one pinion journaled on the die and at least one rack on the carrier meshing with said pinion.

Other objects, advantages and results of the invention are set forth in the following description in conjunction with the accompanying drawings in which:

FIGURE 1 is a side elevation of an extrusion die with deckles attached;

FIGURE 2 is an enlarged fragmentary side elevational view of one end of the die;

FIGURE 3 is a partial section through the die and deckle, on the plane of the line 3—3 of FIGURE 2;

FIGURE 4 is a fragmentary elevational view of one end of the die;

FIGURE 5 is a fragmentary sectional view through the die on the plane of the line 5—5 of FIGURE 2.

Referring to the drawings, the reference character 1 designates an extrusion die of the type used for extrusion laminating and which consists of a body 2 of generally rectangular cross section and whose length is slightly greater than the greatest width of film to be extruded. A manifold hole 3 extends longitudinally of the body parallel to the long sides and bottom of the body, and a slot 4 extending the full length of the body leads from manifold 3 to passage 5 which also extends the full length of the die body and is defined by die jaws 6 and 7. Die jaw 6 is fixed in position on body 2 where it is held by screws 8', whereas die jaw 7 is movable in a direction toward or away from die jaw 6 by means of adjusting screws 8 and is held to body 2 by bolts 9 which allow movement of the jaw by means of oversize clearance holes in jaw 7. The lower portions of jaws 6 and 7 define die orifice or slot 10 from and along each of opposite longitudinal edges of which is a flat surface 10a, the distance between jaws 6 and 7 at said edges determining the thickness of the extruded plastic film and this distance being adjustable by the above mentioned movement of die jaw 7. Affixed to the external sides of die jaws 6 and 7 are electric heaters 11 held to the jaws by means of clamps 12 and affixed to the sides of die body 2 are electric heaters 13. At each end of die body 2 extending downward to cover die jaws 6 and 7 are end plates or caps 14 held to the die body and jaws by screws and acting to seal off the ends of manifold 3, slots 4 and 5, and orifice 10.

The deckling means embodying the invention are denoted generally 15 in FIGURE 1 and since the deckles are the same at both ends of the die, only one will be described, it being understood that they are usually, but not necessarily, installed in pairs. Each deckle consists of U-shaped body or deckle bar carrier 16 having at its top portion two inwardly projecting hanger rail portions 16a which are slidable longitudinally of outwardly projecting track portions 6a and 7a of die jaws 6 and 7 to support the deckle bar carrier. At the top of both upright sections of the U of body 16 and extending from one end of the body 16 to within about two inches of the other end of body 16, the latter end being toward the center of the die, are gear teeth 17 which mesh with gear pinions 18. Pinions 18 are fixed to shaft 19 journaled in bearing 20 which is preferably of a composition which enables operation at elevated temperatures such as a copper-graphite composition, said bearing being supported in end block 21 which is fixed to end plate 14 by screws 22. Each end of shaft 19 is machined to a square or hexagonal shape 21a to accept a standard mechanics wrench by means of which shaft 19 and pinions 18 can be rotated.

Sealing or orifice or slot 10 is accomplished by the deckle bar that includes a strip 23 made of graphite impregnated asbestos, a fluorocarbon plastic such as Teflon, or like material which has the characteristics of low friction coefficient, temperature resistance, and sufficient resiliency to conform to the bottom surfaces of die jaws 6 and 7 and which is bonded to an elongated backing piece or bar 24. The sealing strip 23 and backing piece 24 are held against the die jaws and against longitudinal movement relative to the deckle bar carrier by set screws 25 threaded in deckle body 16. Several of screws 24 are furnished with projections 25a at their upper end which engage corresponding recesses in the bottom of backing piece 24 and serve to impart movement to the seal and backing piece corresponding to the movement of deckle body 16. In practice, screws 25 are tightened just enough to hold seal strip 23 against the die jaws with enough pressure to prevent leakage of plastic but at the same time allow the sliding movement of a strip 23 in the lengthwise direction along the surfaces 10a of the die.

In operation, molten plastic is delivered under pressure to the manifold 3 of the die through an opening in the top of the die not shown from a conventional extruder. After filling manifold 3 the plastic flows through passages 4 and 5 and through orifice 10 and emerges as a thin sheet or film 26 of relatively wide width. In the process of extrusion coating this film then passes into the nip of rolls 27 and 28 and is bonded by pressure in the nip to substrate 29. However, it is not intended that this invention be limited to application on extrusion dies used for extrusion coating, but can be applied to similar type dies used in other processes, for example, film casting, wherein the film 26 is extruded onto the surface of a casting roll where it is cooled and formed into a continuous web of plastic film. In order to regulate the width of the extruded film 26 seal strips 23 are moved toward the center of the die to narrow the width or toward the ends of the die to widen the width, this movement being accomplished by rotating pinions 18 with a wrench applied to shaft end 21a which rotation results in the movement of deckle body 16 through the meshing of the pinion with rack teeth 17 and the corresponding movement of seal strip 23 as explained above.

It can, therefore, be seen that this invention provides a simple, effective means of sealing any required portion of the orifice of an extrusion die, in order to regulate the width of the extruded film. The resilient sealing member effectively seals the orifice under conditions of high temperature and plastic pressure and accommodates itself to any small irregularities in the orifice itself or the bottom surface of the die jaws. The orifice itself can be adjusted at any time and at any portion of its length without interference from the deckle which is not the case with prior art deckles wherein the sealing member extends into the orifice itself. The deckles allow adjustment of the width of the extruded film while the machine is in operation, such adjustment requiring only the use of a standard wrench.

Removal of the deckle from the die is accomplished by rotating pinion 18 in a direction to move the deckle toward the end of the die until the pinion runs out of engagement with rack teeth 17 at which time the entire deckle assembly may be pulled in the direction of the end of the die and removed. Maintenance, outside of routine cleaning, consists only of occasional replacement of seal strip 23 as it becomes worn and this is easily accomplished after the deckle is removed from the die.

We claim:
1. A die having an elongated slot for forming films or sheets of flowable plastic material and provided with bearing surfaces for a deckle bar each extending outwardly from and along one side edge of said slot, a deckle bar having a sealing face bridging said slot and in slidable sealing contact with said bearing surfaces of the die, and means mounting said deckle bar on said die for movement longitudinally of said slot including a track on the die at each side of and parallel to said slot, a U-shaped deckle bar carrier having a base portion supporting the deckle bar and its arms provided with inturned hanger flanges each of which is slidable on one of said tracks, a rack on each of said flanges, and two pinions journaled on a common shaft on said die and each meshing with one of said racks.

2. A die having an elongated slot for forming films or sheets of flowable plastic material and provided with bearing surfaces for a deckle bar each extending outwardly from and along one side edge of said slot, a deckle bar having a sealing face bridging said slot and in slidable sealing contact with said bearing surfaces of the die, and means mounting said deckle bar on said die for movement longitudinally of said slot, the last-named means including a track on said die at each side of said slot and parallel thereto, a deckle bar carrier having a hanger slidable on each track and holding said deckle bar in sealing contact with said surfaces on the die, and means for driving said carrier longitudinally along said tracks including at least one pinion journaled on the die and at least one rack on said carrier meshing with said pinion.

References Cited by the Examiner
UNITED STATES PATENTS

| | | | |
|---|---|---|---|
| 1,350,722 | 8/1920 | Goodenberger | 18—12 |
| 3,013,444 | 12/1961 | Burkhard et al. | |
| 3,018,515 | 1/1962 | Sneddon | 18—12 |
| 3,057,013 | 10/1962 | Loveless. | |
| 3,187,390 | 6/1965 | Frankel et al. | 18—12 |
| 3,218,383 | 11/1965 | White. | |
| 3,238,563 | 3/1966 | Hoffman | 18—12 |

References Cited by the Applicant
UNITED STATES PATENTS

| | | |
|---|---|---|
| 1,687,447 | 10/1928 | Heisel. |
| 2,300,211 | 10/1942 | Eberlin. |
| 2,712,155 | 7/1955 | Nelson. |
| 2,859,475 | 11/1958 | Tornberg. |
| 2,982,995 | 5/1961 | Groleau. |

WILLIAM J. STEPHENSON, *Primary Examiner.*